US008139121B2

(12) United States Patent
Ito (10) Patent No.: US 8,139,121 B2
(45) Date of Patent: Mar. 20, 2012

(54) IMAGING APPARATUS FOR SETTING IMAGE AREAS HAVING INDIVIDUAL FRAME RATES

(75) Inventor: Hiroshi Ito, Tokyo (JP)

(73) Assignee: Olympus Corporation, Tokyo (JP)

( * ) Notice: Subject to any disclaimer, the term of this patent is extended or adjusted under 35 U.S.C. 154(b) by 356 days.

(21) Appl. No.: 11/633,159

(22) Filed: Dec. 4, 2006

(65) Prior Publication Data

US 2007/0195182 A1    Aug. 23, 2007

(30) Foreign Application Priority Data

Feb. 21, 2006   (JP) ................. 2006-043566

(51) Int. Cl.
*H04N 7/18*   (2006.01)
(52) U.S. Cl. ............... 348/222.1; 348/155; 348/169; 348/302; 348/308
(58) Field of Classification Search .......... 348/294–324, 348/333.11, 267; 250/208.1
See application file for complete search history.

(56) References Cited

U.S. PATENT DOCUMENTS

| | | | |
|---|---|---|---|
| 5,262,871 A * | 11/1993 | Wilder et al. ................. | 348/307 |
| 5,489,945 A * | 2/1996 | Kannegundla et al. ....... | 348/521 |
| 5,541,654 A * | 7/1996 | Roberts ......................... | 348/301 |
| 6,337,713 B1 * | 1/2002 | Sato ............................. | 348/311 |
| 6,614,477 B1 * | 9/2003 | Lee et al. ..................... | 348/312 |
| 6,930,722 B1 * | 8/2005 | Nakamura et al. ............ | 348/362 |
| 6,933,975 B2 * | 8/2005 | Wen .............................. | 348/312 |
| 6,972,795 B1 * | 12/2005 | Etoh et al. .................... | 348/311 |
| 7,015,965 B2 * | 3/2006 | Asada et al. .................. | 348/312 |
| 7,199,827 B2 * | 4/2007 | Inokuma et al. .............. | 348/300 |
| 7,218,351 B2 * | 5/2007 | Miyahara et al. ............. | 348/313 |
| 7,233,355 B2 * | 6/2007 | Kameyama et al. .......... | 348/317 |
| 7,414,652 B2 * | 8/2008 | Shinotsuka ................... | 348/294 |
| 7,415,166 B2 * | 8/2008 | Kubota ......................... | 382/284 |
| 7,420,602 B2 * | 9/2008 | Fraenkel et al. .............. | 348/294 |

(Continued)

FOREIGN PATENT DOCUMENTS

JP   04-277986   10/1992

(Continued)

OTHER PUBLICATIONS

Office Action issued in counterpart Japanese Patent Application No. 2006-043566 on Feb. 8, 2011.

*Primary Examiner* — Sinh Tran
*Assistant Examiner* — Paul Berardesca
(74) *Attorney, Agent, or Firm* — Volpe and Koenig P.C.

(57) ABSTRACT

An imaging apparatus includes: an imaging device for performing photoelectric conversion of light incident on a photodetective area thereof, and reading signals from the photodetective area so as to output the signals as image signals; a divided area setting device for setting a plurality of image areas on the photodetective area; a frame rate setting device for setting and assigning frame rates individually to the image areas; and a reading control device for individually controlling a timing for reading the signals from each image area set on the photodetective area, in accordance with the corresponding frame rate set by the frame rate setting device. The frame rate setting device may set each frame rate for each frame, or may set one of at least two frame rates assigned to the image areas and then set another frame rate assigned to another image area in accordance with the already-set frame rate.

5 Claims, 10 Drawing Sheets

U.S. PATENT DOCUMENTS

| | | | |
|---|---|---|---|
| 2002/0105584 A1* | 8/2002 | Jung et al. | 348/303 |
| 2002/0156847 A1* | 10/2002 | Kitamura | 709/203 |
| 2003/0133593 A1* | 7/2003 | Tullberg et al. | 382/103 |
| 2003/0169902 A1* | 9/2003 | Satoh | 382/104 |
| 2004/0130637 A1* | 7/2004 | Kake et al. | 348/239 |
| 2005/0264679 A1* | 12/2005 | Sasaki et al. | 348/345 |
| 2006/0119903 A1* | 6/2006 | Chiba et al. | 358/474 |
| 2006/0176951 A1* | 8/2006 | Berman et al. | 375/240.01 |

FOREIGN PATENT DOCUMENTS

| | | |
|---|---|---|
| JP | 2004-277986 | 10/1992 |
| JP | 07-298112 | 11/1995 |
| JP | 2003-189186 | 7/2003 |
| JP | 2004-240844 | 8/2004 |

\* cited by examiner

IMAGING APPARATUS FOR SETTING IMAGE AREAS HAVING INDIVIDUAL FRAME RATES

BACKGROUND OF THE INVENTION

1. Field of the Invention

The present invention relates to an imaging apparatus employing an improved method for reading signals from a photodetective area of an imaging device.

Priority is claimed on Japanese Patent Application No. 2006-43566, filed Feb. 21, 2006, the content of which is incorporated herein by reference.

2. Description of the Related Art

Some imaging apparatuses have a function of changing the frame rate in accordance with use (see, for example, Japanese Patent No. 3129599). In video photography, when the frame rate is changed in accordance with the movement of a subject and it is converted to a specific rate for display (i.e., a display frame rate) so as to reproduce images, natural slow motion or high-speed motion video images can be displayed. For example, when images are captured using a frame rate higher than the display frame rate, and the frame rate of the images is then converted in conformity with the display frame rate, slow-motion reproduced images are displayed, and in the converse case, high-speed reproduced images are displayed.

In such cases, it may be unnecessary to process the whole area of one image frame at the same frame rate, for example, when a specific subject moves on a background which almost stands still. In order to perform photography at a high frame rate in accordance with the speed of a moving subject, when signals are read at the same high-speed frame rate from the whole image area of each image frame, almost the same image data of the background which almost stands still is also obtained several times over a plurality of image frames, and is sequentially processed in the following circuit.

SUMMARY OF THE INVENTION

The present invention provides an imaging apparatus comprising:

an imaging device for performing photoelectric conversion of light incident on a photodetective area thereof, and reading signals from the photodetective area so as to output the signals as image signals;

a divided area setting device for setting a plurality of image areas on the photodetective area;

a frame rate setting device for setting and assigning frame rates individually to the image areas; and a reading control device for individually controlling a timing for reading the signals from each image area set on the photodetective area, in accordance with the corresponding frame rate set by the frame rate setting device.

The frame rate setting device may set each frame rate for each frame.

In addition, the frame rate setting device may set one of at least two frame rates assigned to the image areas, and then set another frame rate assigned to another image area in accordance with the frame rate which has been set.

In this case, in a typical example, said another frame rate is determined by setting a frame rate ratio of said one of at least two frame rates to said another frame rate.

In a preferable example, the imaging apparatus may further comprise:

a signal processing device for synthesizing the image signals read individually from the image areas, so as to generate an image signal having the same frame rate with respect to the image areas.

In another preferable example, the imaging apparatus may further comprise:

a storage device for storing the image signals read individually from the image areas in individual storage areas corresponding to the image areas.

In another preferable example, the imaging apparatus may further comprise:

a target subject setting device for setting a target subject in an image captured by the imaging device; and a target subject detecting device for detecting the target subject set by the target subject setting device based on the image signals, wherein:

the divided area setting device sets the image areas in accordance with a position where the target subject detected by the target subject detecting device is present in the image.

In this case, typically, the target subject is set as an area which contains an actual target subject.

DESCRIPTION OF THE PREFERRED EMBODIMENTS

Hereinafter, embodiments in accordance with the present invention will be described with reference to the appended figures.

Figure 1:
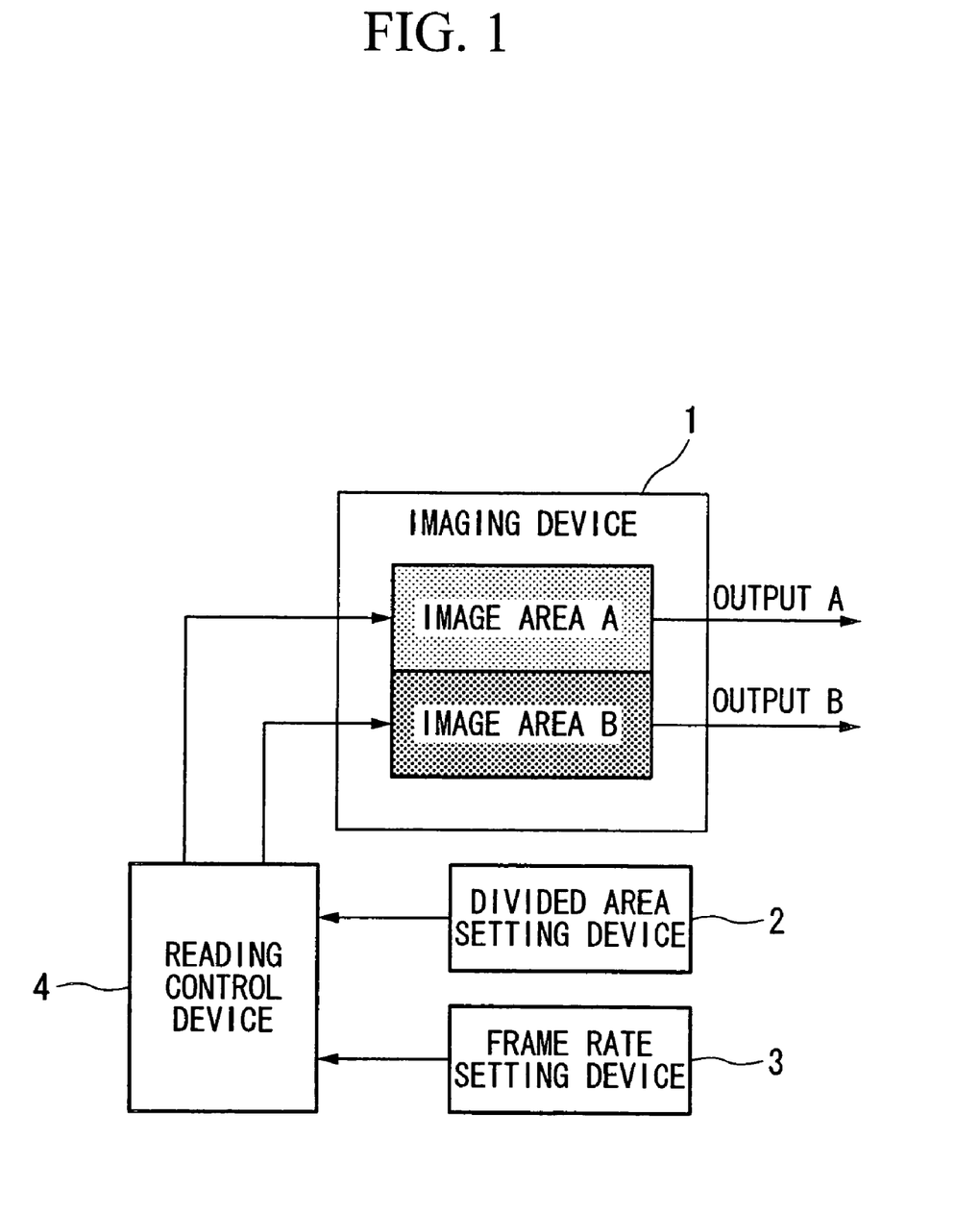
FIG. 1 is a block diagram showing the structure of an imaging apparatus as a first embodiment in accordance with the present invention.

A first embodiment of the present invention will be explained first. FIG. 1 shows the structure of an imaging apparatus of the present embodiment. An imaging device 1 performs photoelectric conversion of light incident onto a photodetective area thereof, and reads each signal from the photodetective area, which is output as an image signal. The photodetective area of the imaging device 1 is divided into two areas (i.e., image areas A and B). Each signal read from each area is individually sent to the following device as an output signal A or B (i.e., the image signal). The signal reading process from the imaging device 1 is controlled by a divided area setting device 2, a frame rate setting device 3, and a reading control device 4.

The divided area setting device 2 sets a plurality of image areas in the photodetective area of the imaging device 1. This setting of the image area is performed in accordance with a user's designation, or automatically as explained in a fifth embodiment later.

The frame rate setting device 3 assigns a frame rate to each image area set by the divided area setting device 2.

In accordance with the frame rate set by the frame rate setting device 3, the reading control device 4 controls the timing of the signal reading from each image area of the photodetective area in the imaging device 1.

Figure 2:
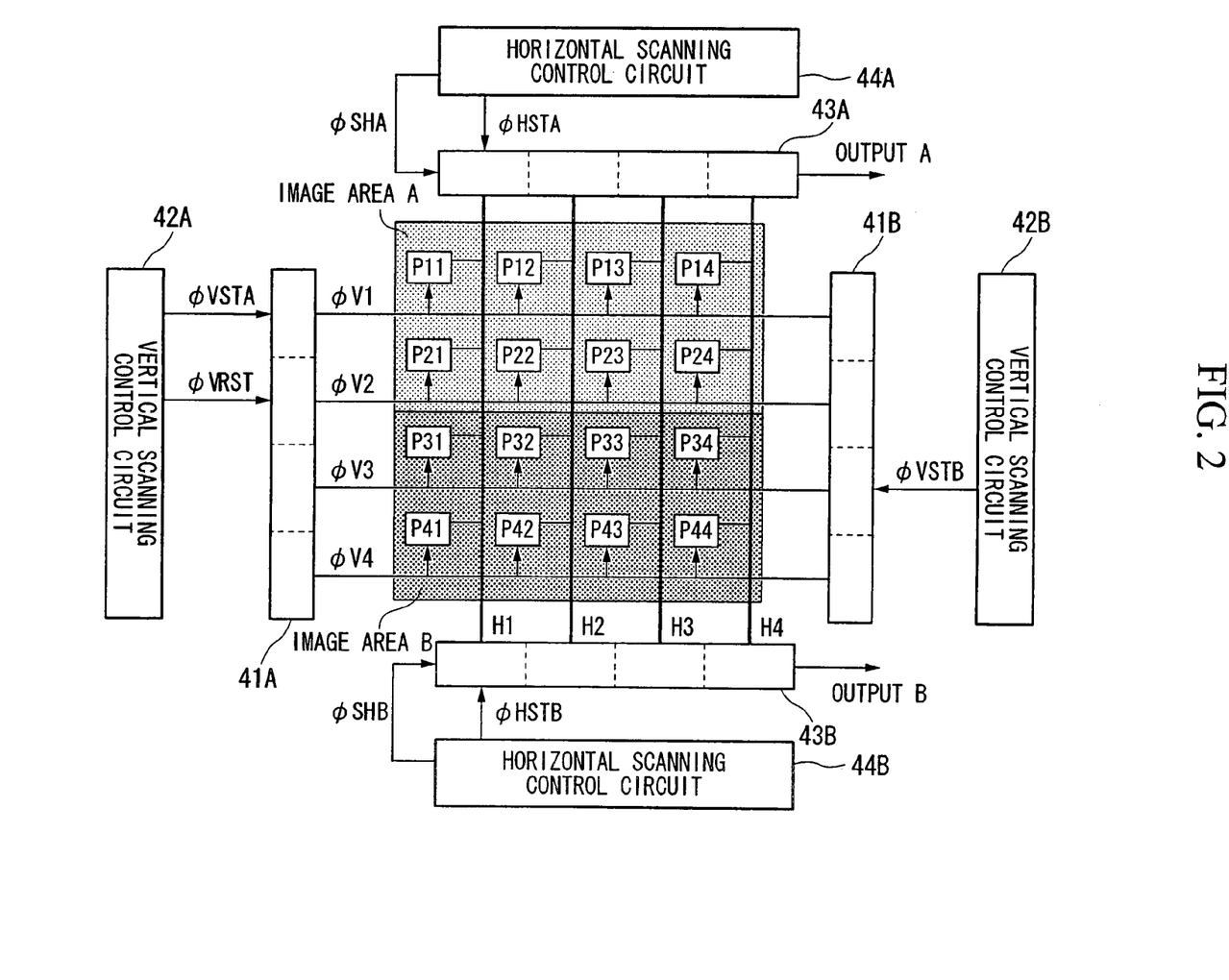
FIG. 2 is a block diagram showing the internal structure of an imaging device in the imaging apparatus of the first embodiment.

FIG. 2 shows the internal structure of the imaging device 1. In the present embodiment, an X-Y address type imaging device structure is shown as an example.

In FIG. 2, a 4×4 image area (i.e., a photodetective area) consisting of pixels P11 to P44 is divided into two areas: an image area A including the upper two lines, and an image area B including the lower two lines. With respect to subscripts n and m of pixel "Pnm", n indicates the line number, and m indicates the column number. For example, P23 indicates the pixel at line 2, column 3.

In order to read a signal from each pixel in each image area, vertical scanning circuits 41A and 41B, vertical scanning control circuits 42A and 42B, horizontal scanning circuits 43A and 43B, and horizontal scanning control circuits 44A and 44B are provided. That is, each circuit to which a reference symbol A is appended is used for signal reading from the image area A, and each circuit to which a reference symbol B is appended is used for signal reading from the image area B.

From these circuits, various kinds of control pulse signals are output to specific objects to be controlled (see symbols having the first letter φ in FIG. 2).

The reading control device 4 in FIG. 1 corresponds to these scanning circuits and scanning control circuits. The signal stored at each pixel due to the photoelectric conversion is sent to a relevant horizontal scanning circuit via a vertical reading signal line Hx (x=1 to 4), and temporarily stored in a signal holding circuit such as a capacitor (not shown) in the horizontal scanning circuit. This signal is then output sequentially from an output line provided to each horizontal scanning circuit.

The vertical scanning circuits 41A and 41B output pulse signals φVy (y=1 to 4) (i.e., horizontal reading pulse signals) for reading the signal from each pixel. The control is performed for each line, and when the pulse state becomes High (i.e., a high state), the signal from each pixel is loaded on a relevant vertical reading signal line Hx.

The vertical scanning control circuits 42A and 42B respectively control the operations of the vertical scanning circuits 41A and 41B. More specifically, the vertical scanning control circuits 42A and 42B set the position and timing of the scanning start line in each image area by using pulse signals φVSTA and φVSTB, and also set the position and timing of the scanning end line in the image area A by using a pulse signal φVRST. The pulse state H indicates the active state of each pulse signal. For example, when the pulse signals φVSTA and φVSTB are each High, the scanning start position and timing of each image area are set, and when the pulse signal φVRST is High, the scanning end of the image area A is set.

With respect to the image area B, no pulse signal is used for setting the position and timing of the scanning end line. This is because when scanning of the last line in the whole photodetective area ends, a resetting operation is automatically performed. However, a pulse signal for setting the position and timing of the scanning end line may be employed.

The horizontal scanning circuits 43A and 43B temporarily store each signal from the vertical reading signal line Hx, and outputs and transfers it sequentially. The horizontal scanning control circuits 44A and 44B respectively control the horizontal scanning circuits 43A and 43B.

Pulse signals φSHA and φSHB are used for controlling the timing for holding the signal in each signal holding circuit provided in the horizontal scanning circuits 43A and 43B, where the signal holding circuit is provided for each vertical reading signal line Hx. When the signal state is High, the signal is retained by the relevant signal holding circuit.

Pulse signals φHSTA and φHSTB are used for controlling the position and timing of the scanning start column with respect to the retained signals. When the pulse state is High, the scanning start position and timing are set.

Below, the operation flow for reading each signal from the imaging device 1 will be explained with reference to FIG. 3. Signal reading from the image area A is performed using the vertical scanning circuit 41A, the vertical scanning control circuit 42A, the horizontal scanning circuit 43A, and the horizontal scanning control circuit 44A. The reading control using the pulse signals output from the scanning circuits is performed during a horizontal blanking interval. First, when the vertical scanning control pulse signal φVSTA output from the vertical scanning control circuit 42A to the vertical scanning circuit 41A becomes High, the position of the scanning start line is designated, so that the vertical scanning circuit 41A is set in a scanning start state. In each vertical scanning circuit shown in FIG. 2, divided areas indicated by dashed lines are units of the scanning part for controlling line-base reading. When the reading control pulse signal φV1 assigned to the first line to which the pulse signal φVSTA is supplied becomes and holds High during a specific time period, signals from the pixels P11 to P14 (i.e., pixel signals) of the first line are respectively output to the vertical reading signal lines H1 to H4.

The output pixel signals are transmitted to the horizontal scanning circuit 43A, and are temporarily held by the signal holding circuits which are directly coupled to the corresponding vertical reading signal lines. The timing of signal capturing of each signal holding circuit is controlled by a signal charge holding pulse signal φSHA output from the horizontal scanning control circuit 44A. When this pulse signal is made High, the signal holding circuit receives the image signal. In the present embodiment, this timing is equivalent to the timing when the signal is loaded on the relevant vertical reading signal line due to the reading control pulse signals φV1 to φV4. In accordance with the above process, the image signals from the pixels P11 to P14 (i.e., of one line) are stored in the signal holding circuits of the horizontal scanning circuit 43A, which are assigned to the vertical reading signal lines.

After that, the horizontal scanning control circuit 44A makes the horizontal scanning control pulse signal φHSTA High, so as to start the scanning for signal reading from a specific position. When all pixel signals belonging to the first line have been scanned, the operation of the horizontal scanning control circuit 44A is terminated. When the horizontal scanning control pulse signal φHSTA is made High for the first line (see FIG. 2), pixel signals P11,1 to P14,1 are obtained as "output A" during a "one-line period" (see FIG. 3). Here, "a" of "Pnm,a" indicates the frame number.

If the vertical and horizontal scanning circuits both have a structure including a shift register, then after the command to start scanning is issued, lines or columns are automatically scanned until a reset flag is provided. When the vertical scanning of the first line is completed, the vertical scanning circuit 41A makes the vertical scanning pulse signal φV2 (for the second line) active (i.e., High), and simultaneously, the horizontal scanning control circuit 44A makes the signal charge holding pulse signal φSHA High. The horizontal scanning control circuit 44A then makes the horizontal scanning control pulse signal φHSTA High, so that pixel signals are read from the pixels P21 to P24 on the second line. Due to the scanning operation similar to that applied to the first line, pixel signals P21,1 to P24,1 (see FIG. 3) are obtained as the output A. In the image area A, when the pixel signals belonging to the above two lines have been read, the scanning of one frame is completed. Therefore, the pulse signal φVRST becomes High at the pulse output timing coming immediately after the signal reading of the second line is completed. Accordingly, the vertical scanning is terminated.

Figure 3:
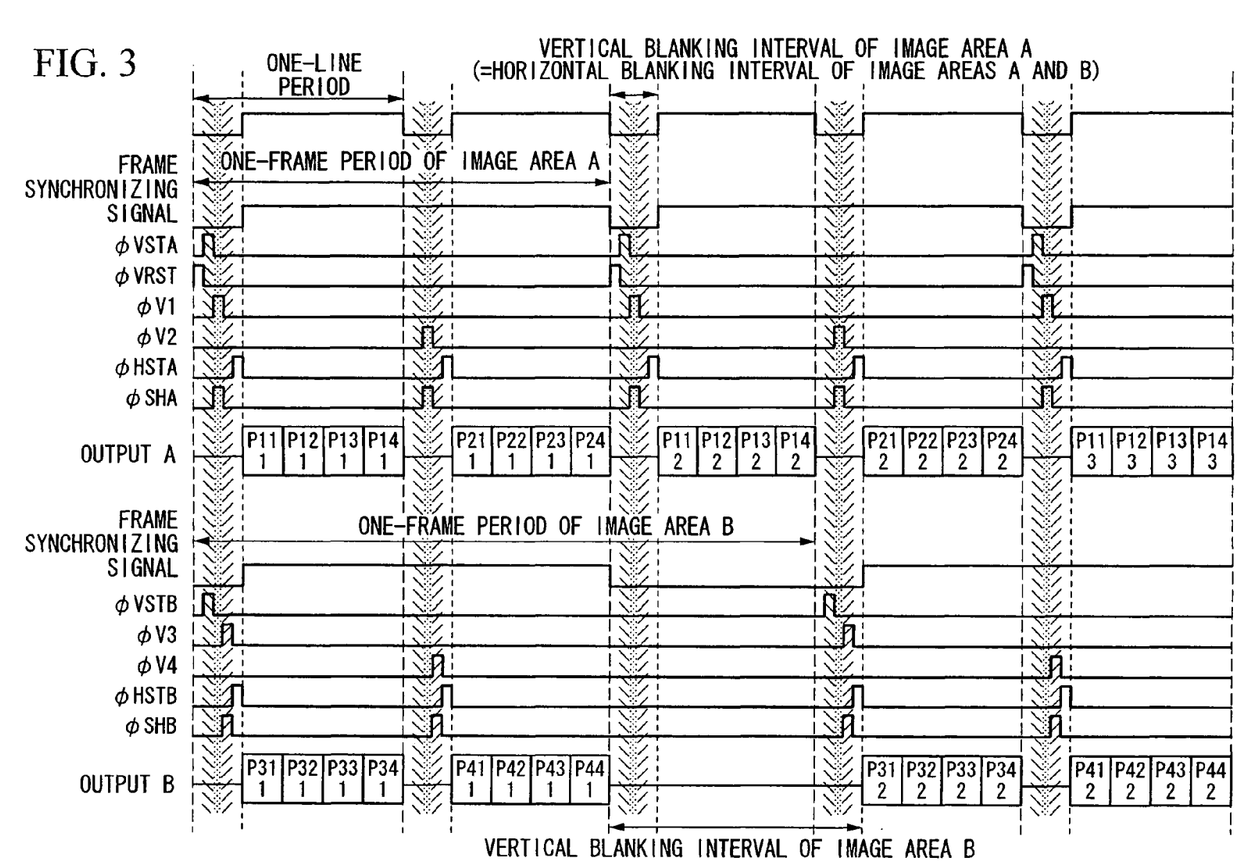
FIG. 3 is a timing chart showing the operation timing of the imaging apparatus in the first embodiment.

With respect to the image area A, signals indicated by the output A in FIG. 3 can be obtained by repeating the above operation.

On the other hand, signal reading from the image area B is performed by the vertical scanning circuit 41B, the vertical scanning control circuit 42B, the horizontal scanning circuit 43B, and the horizontal scanning control circuit 44B. The basic signal reading operation for the image area B is identical to the signal reading for the image area A; thus, explanations thereof are omitted except for the following notes:

(1) When a plurality of different signals are loaded on the same signal line, signals may be broken. Therefore, control is performed so that signals are not loaded on the same vertical reading signal line Hx from a plurality of pixels belonging to different lines.
(2) The operation for processing the same line cannot be controlled simultaneously using a plurality of pulse signals; thus, control is performed so that the same line is not scanning-controlled for both image areas A and B.
(3) In order to assign different frame periods to the image areas A and B, a time period is provided during which signal reading is performed from only one of the image areas (i.e., not performed from the other image area). In the present embodiment, this time period is provided in the vertical blanking interval of the other image area.

With respect to the above item (1), different timings are set for making the respective pulse signals φV1 and φV3 High in the same horizontal blanking interval, and different timings are also set for making the respective pulse signals φSHA and φSHB High. As shown in FIG. 3, at the timing when the pulse signals φV1 and φSHA become High, the pixel signals with respect to the first line are stored via the vertical reading signal lines H1 to H4 into the signal holding circuits of the horizontal scanning circuit 43A. After that, at the timing when the pulse signals φV3 and φSHB become High, the pixel signals with respect to the third line are stored via the vertical reading signal lines H1 to H4 into the signal holding circuits of the horizontal scanning circuit 43B. Accordingly, signals are not simultaneously loaded on the same vertical reading signal line Hx from a plurality of pixels.

With respect to the above item (2), the divided area setting device 2 in FIG. 1 controls the setting of image areas so that the vertical scanning area is not overlapped between the image areas A and B.

With respect to the above item (3), the frame rate setting device 3 and the reading control device 4 control the signal reading period. As shown in FIG. 3, a period is provided in which the scanning control pulse signals φVSTB, φV3, φV4, φHSTB, and φSHB are each not High, so as to stop the reading from the image area B. This reading stop period is provided in the vertical blanking interval so that the one-frame period can be changed, where the unit for changing the period is one line.

In FIG. 3, reading from the image area B is prohibited for the one-line period, so that the one-frame period of the image area B can be longer than that of the image area A by the one-line period.

Also in FIG. 3, while the pixel signals of one frame are read from the image area B, the pixel signals of 1.5 frames are read from the image area A; thus, the frame rate ratio of the image signal corresponding to the image area A to that of the image signal corresponding to the image area B is 3:2. In order to control the signal reading period in accordance with the set frame rate, the horizontal and vertical blanking intervals should be appropriately changed.

For example, if the length of the vertical blanking interval of the image area B is changed to the two-line period (i.e., twice as long as the one-line period), the pixel signals of two frames are read from the image area A while the pixel signals of one frame are read from the image area B. Therefore, in this case, the frame rate ratio of the image signal corresponding to the image area A to that of the image signal corresponding to the image area B is 2:1.

In the present embodiment, the photodetective area is divided into two areas in the vertical direction; however, the area division may be performed in the horizontal direction. In addition, the number of the image areas is not limited to two, and more image areas may be defined. In this case, the same number of vertical and horizontal scanning circuits and also the same number of vertical and horizontal scanning control circuits as the number of the image areas should be provided. Furthermore, the present embodiment employs the X-Y address type imaging device; however, the basic concept of the present invention does not limitedly employ this type.

As discussed above, in accordance with the present embodiment, image signals of an independent frame rate can be obtained for each image area. Therefore, the amount of image data per unit time can be adjusted for each image area; thus, high-frame-rate photography corresponding to the performance in each frame of the imaging apparatus itself (i.e., capabilities of compression, data storage, or the like) can be performed without causing problems in the signal processing.

Additionally, when the frame rate is increased, the burden of signal processing imposed on signal processing circuits is increased. However, an appropriate amount of data can be assigned for each image area in accordance with the photographer's intension, for example, a lower frame rate is assigned to an area where no specific photographic effect is applied, thereby reducing the burden with respect to the signal processing.

Figure 4:
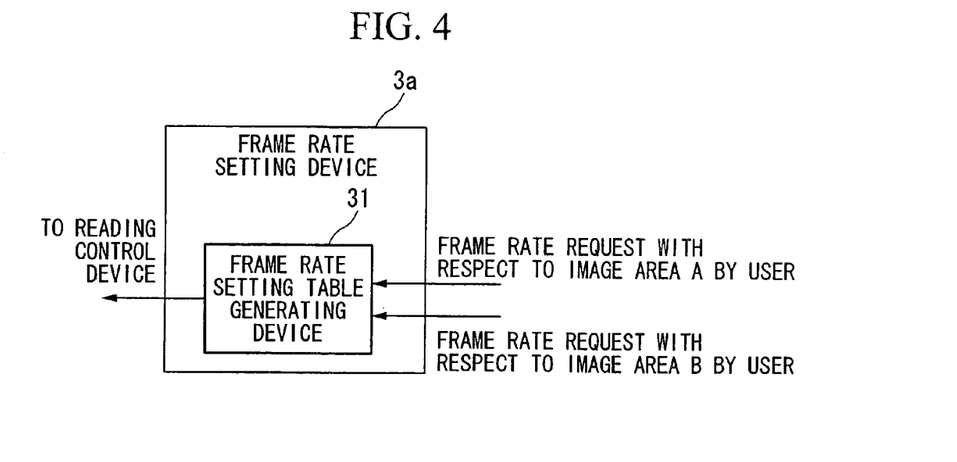
FIG. 4 is a block diagram showing the structure of a frame rate setting device employed in an imaging apparatus as a second embodiment in accordance with the present invention.

Next, a second embodiment of the present invention will be explained. FIG. 4 shows the structure of a frame rate setting device 3a employed in the present embodiment. When the user inputs specific data by operating setting keys or by a remote control using a personal computer, data of (variable) frame rates respectively assigned to the image areas A and B are input into a frame rate setting table generating device 31.

Based on the input data, the frame rate setting table generating device 31 generates a frame rate setting table which is a list of frame rates of each frame in each image area, and outputs the table to the reading control device 4. Accordingly, it is possible to independently change the frame rate of each captured frame in each image area.

Figure 5:
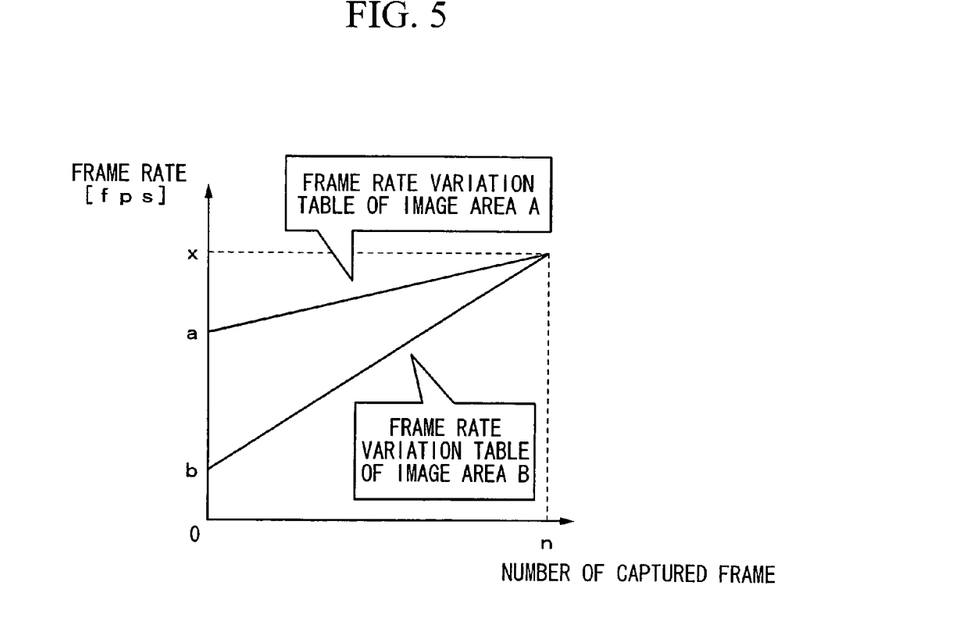
FIG. 5 is a diagram used for explaining an example of frame rate setting in the second embodiment.

FIG. 5 shows an example of the frame rate setting. In FIG. 5, with respect to the image area A, photography is started at a frame rate of "a" fps, and the frame rate then varies in a manner such that it reaches "x" fps after n frames are captured. On the other hand, with respect to the image area B, photography is started at a frame rate of "b" fps, and the frame rate then varies in a manner such that it reaches "x" fps after n frames are captured. As explained in the first embodiment, the frame rate can be changed by changing the length of the horizontal or vertical blanking interval.

In order to vary the frame rate in a manner such that it starts at α fps and then reaches β fps after γ seconds, the user may set parameters α, β and γ. Values of these parameters are communicated to the frame rate setting table generating device 31.

Based on the values of the parameters, the frame rate setting table generating device 31 generates a table for indicating frame rate variations as shown in FIG. 5, and outputs it as pulse or register data which can be developed and used by the reading control device 4. Based on the data received from the frame rate setting device 3a, the reading control device 4 controls the signal reading from the imaging device 1.

Figure 6:
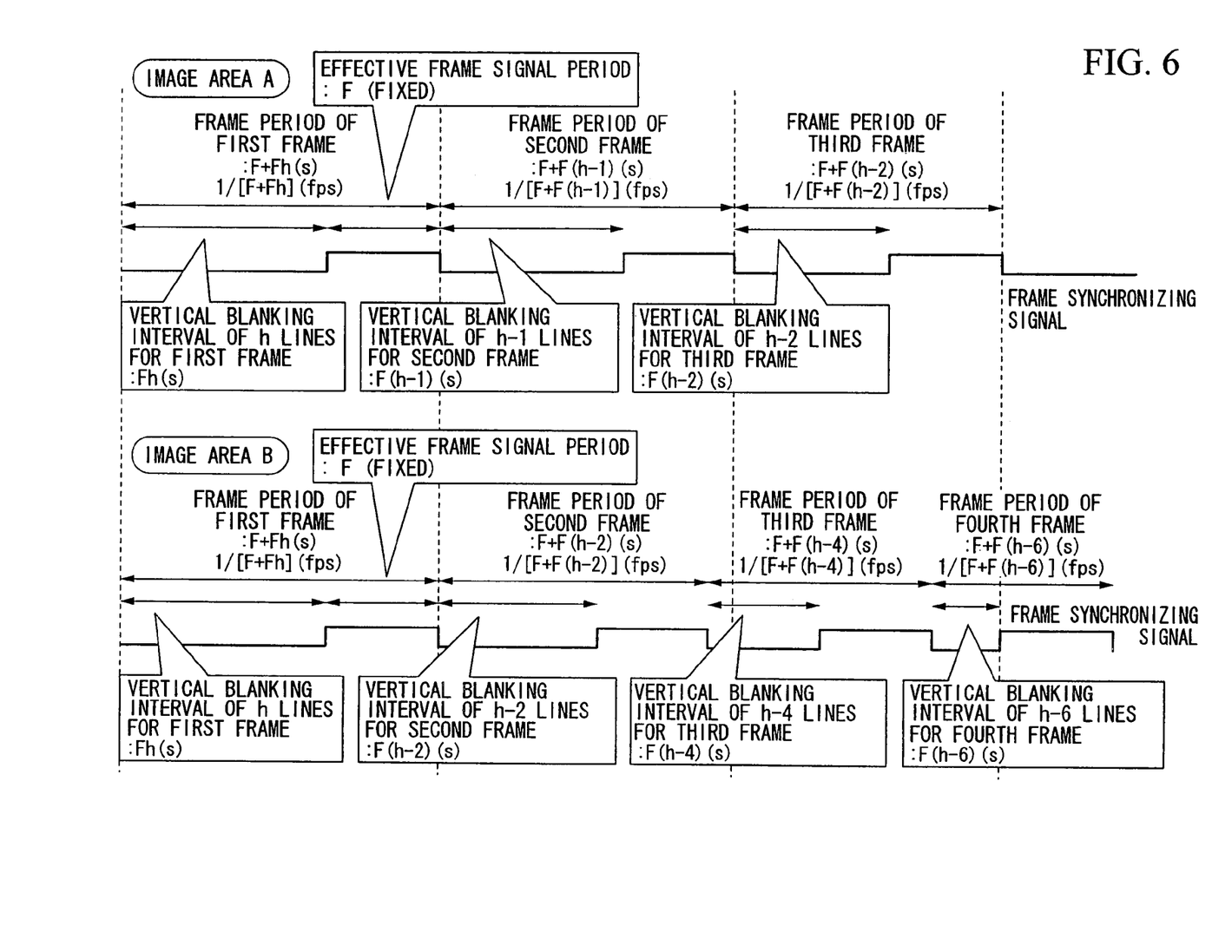
FIG. 6 is a timing chart showing signal reading from each image area in the second embodiment.

FIG. 6 shows the states of signal reading in each image area when the frame rate is independently set for each frame from the start of photography. In the shown example, the frame rate gradually increases in both image areas A and B. The "one-frame period" consists of the vertical blanking interval and the effective frame signal period, and the frame rate is changed by changing the number of lines for forming the vertical blanking interval, for each frame.

In FIG. 6, with respect to the image area A, the frame rate is increased by the one-line period for each frame (i.e., the number of lines for forming the vertical blanking interval is decreased by 1 for each frame), and with respect to the image area B, the frame rate is increased by the two-line period for each frame (i.e., the number of lines for forming the vertical blanking interval is decreased by 2 for each frame).

In the example of FIG. 6, the number of lines assigned to the vertical blanking interval is changed; however, all intervals including the horizontal blanking interval, formed by such lines, may be changed, or only a specific interval may be changed.

Figure 7:
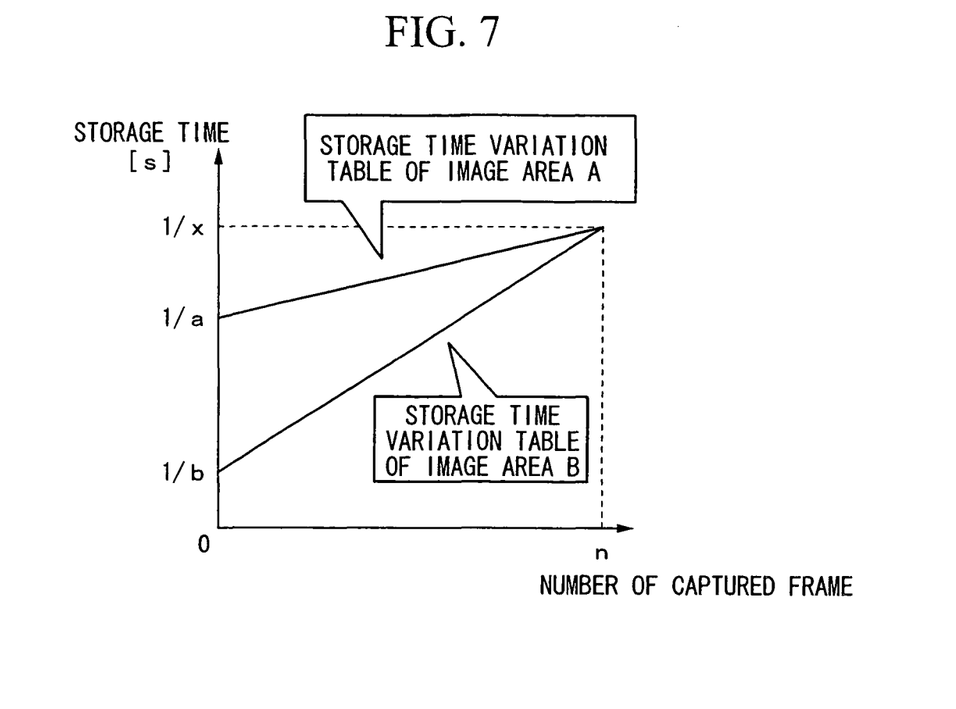
FIG. 7 is a diagram used for explaining an example of storage time setting in the second embodiment.

The frame rate setting device 3a can control not only the frame rate but also a time period for storing the signal (i.e., a storage time or an integration time). FIG. 7 shows an example of changing the storage time for each frame from the start of photography. The storage time shown in FIG. 7 is set in accordance with the frame rate variation shown in FIG. 5.

With respect to the image area A, photography is started at a storage time of 1/a sec, and the storage time reaches 1/x sec after n frames are captured. With respect to the image area B, photography is started at a storage time of 1/b sec, and the storage time reaches 1/x sec after n frames are captured. Data of the storage time set by the frame rate setting device 3a is output to the reading control device 4. Based on this data, the reading control device 4 controls the timings of outputting the pulse signals φV1 to φV4, and the like, so as to control the storage time.

Generally, the storage time can be set (i.e., changed) with the unit of one frame. Even when the vertical blanking interval is changed as discussed above, no specific restriction occurs for setting the storage time. Therefore, the frame rate and the storage time can be set relatively freely. In accordance with the combination of the frame rate and the storage time, various photographic effects can be produced. Each setting can be executed during the vertical blanking interval (see FIG. 3) which functions as a break between frame operations.

Also with respect to the setting of data for performing the reading control, an operation storage device for storing the data with respect to the frame rate and the storage time may be provided in the reading control device 4. All data to be stored may be set in the initial state of the apparatus at the start of photography, or each piece of data may be set in the vertical blanking interval of each frame.

The user can set the frame rate using various kinds of setting methods. For example, the frame rate can be dynamically changed by rotating a dial-form member provided to the imaging apparatus, so as to perform fine setting.

In accordance with the above-described operation, the frame rate can be set for each image area without causing a failure in captured images during video photography; thus, it is unnecessary to stop the photography so as to set the frame rate. In addition, the frame rate can be changed dynamically; thus, it can be changed smoothly. For example, it can be gradually changed for each frame in accordance with the movement of the subject.

Figure 8:
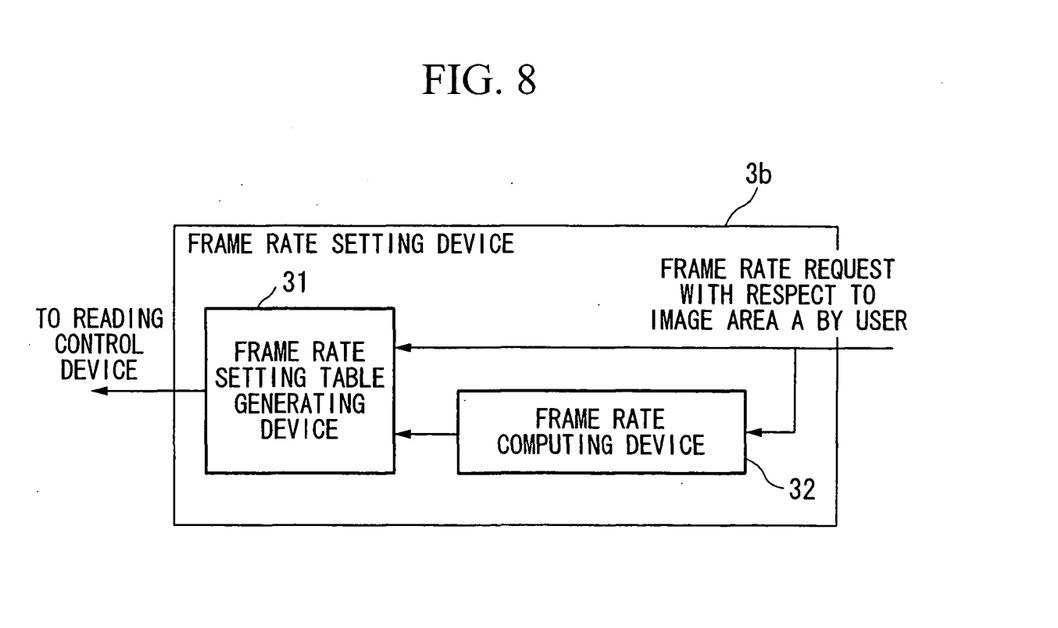
FIG. 8 is a block diagram showing the structure of a frame rate setting device employed in an imaging apparatus as a third embodiment in accordance with the present invention.

Next, a third embodiment of the present invention will be explained. FIG. 8 shows the structure of a frame rate setting device 3b employed in the present embodiment. When the user inputs specific data by using setting keys or by a remote control using a personal computer, data of the frame rate assigned to the image area A is input into a frame rate setting table generating device 31 and a frame rate computing device 32. In contrast to the second embodiment, the user inputs only the frame rate of the image area A, and the frame rate of the image area B is set in accordance with the frame rate of the image area A. Here, as explained later, the user may set a ratio C of the frame rate of the image area A to the frame rate of the image area B.

The frame rate computing device 32 computes the frame rate of the image area B in accordance with the input frame rate of the image area A, and outputs the result of computation to the frame rate setting table generating device 31. Based on the input data, the frame rate setting table generating device 31 generates a frame rate setting table which is a list of frame rates of each frame in each image area, and outputs it to the reading control device 4. Accordingly, it is possible to independently change the frame rate for each frame.

The other functions relating to the frame rate setting are identical to those of the second embodiment. Therefore, based on the frame rate (and the storage time, and the like) set for each image area, signal reading is performed from each image area. In accordance with the above structure, the user does not need to individually set conditions such as the frame rate for different image areas, thereby allowing comfortable user operation.

The frame rate of the image area B may be set as follows. Here, it is assumed that the user can designate a condition for computing the frame rate of the image area B. In this case, it is possible to provide an imaging apparatus which can better meet the needs of the photographer.

In the first step, the user sets the frame rate of the image area A (which includes a target subject). The user then sets the ratio C of the frame rate of the image area A to the frame rate of the image area B. The frame rate computing device 32 computes the frame rate of the image area B corresponding to the frame rate of the image area A in a manner such that the ratio of the frame rate of the image area A to the frame rate of the image area B results in C.

Accordingly, the user should set only a desired frame rate assigned to the image area A where the target subject exists, and the frame rate of the image area B is automatically set in accordance with specific conditions. Therefore, the user does not need to spend time setting the frame rate of the image area B whose image data is not so important for the user.

In other words, it is unnecessary to set the frame rate of the image area B every time the frame rate of the image area A is changed. Therefore, even when different frame rates are assigned to a plurality of image areas, it is unnecessary to individually set the frame rate to each image area, and comfortable photography can be performed without forcing the photographer to perform a complex operation.

Figure 9:
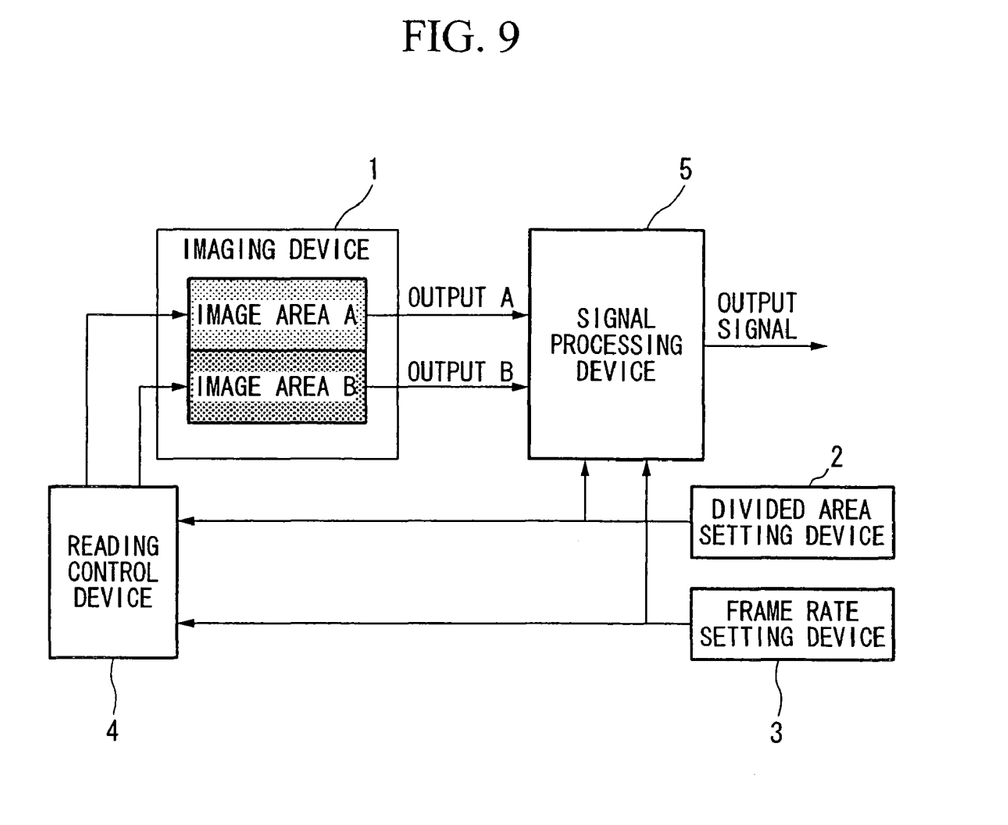
FIG. 9 is a block diagram showing the structure of an imaging apparatus as a fourth embodiment in accordance with the present invention.

Next, a fourth embodiment of the present invention will be explained. FIG. 9 shows the structure of the imaging apparatus of the present embodiment. In addition to the basic structure shown in FIG. 1, a signal processing device 5 for processing the image signals (see outputs A and B in FIG. 9) with respect to the image areas A and B is provided, and each signal output from the signal processing device 5 is sent to a video signal processing device (not shown) provided thereafter. The structural elements other than the signal processing device 5 are identical to those of the first embodiment.

The signal processing device 5 synthesizes two image signals read from the image areas A and B at different frame rates into one (i.e., the same) image signal. Therefore, the present embodiment has a distinctive feature in which the signal output from the signal processing device 5 after the above synthesizing process can be handled as the signal having the same frame rate between both areas.

For example, when the signal reading is performed at a frame rate of 60 frames per second with respect to the image area A and also at a frame rate of 30 frames per second with respect to the image area B, and signals output from the imaging apparatus at the frame rate of 60 frames per second are required, the frames of the image area B are doubled due to interpolation between the frames, so as to produce a pseudo frame rate of 60 frames per second. Accordingly, the number of frames per second becomes the same between both image areas, and then both image signals are synthesized into one image signal.

For the frame interpolation, a frame memory having a specific capacity may be used so as to repeat an operation of reading the signal of each frame of the image area B, which was stored at the frame rate of 30 frames per second in the memory writing, as signals of two frames at the frame rate of 60 frames per second.

When the signals are read from a plurality of image areas at different frame rates, captured video image signals have different amounts of data per unit time for each image area. However, in the present embodiment, such video image signals are synthesized so as to produce image data which can be processed with a unit of one frame over the entire area, and a series of video signals can be output from the imaging apparatus as a final product.

With respect to the frame interpolation for the image area having a lower frame rate, the signal of the same frame can be repeatedly used as described above; however, a signal obtained by an arithmetic operation using a plurality of frames may be assigned to a frame to be interpolated so as to compensate the difference between different frame rates.

For example, the pixel signals (of the same position of the relevant image area) belonging to the frames immediately before and after a target frame for the interpolation are subjected to a specific arithmetic operation so as to obtain an interpolated signal for the target frame.

More specifically, when F and E respectively indicate the signals of the frames immediately before and after the target frame, the signal of the interpolated frame C can be computed using the following formula:

$$C = (n \times F + m \times E)/(n+m)$$

A plurality of different signals which can be assigned to interpolated frames can be generated by changing the combination of the values of n and m. If the difference between the frame rates of different image areas is large, many signals must be generated for interpolated frames. In such a case, instead of using the same signal repeatedly, it is preferable to generate a plurality of signals for interpolation by changing the addition ratio (set by n and m when using the above formula) of the frames immediately before and after the target frame, thereby resulting in artificially smoother video image display.

Figure 10:
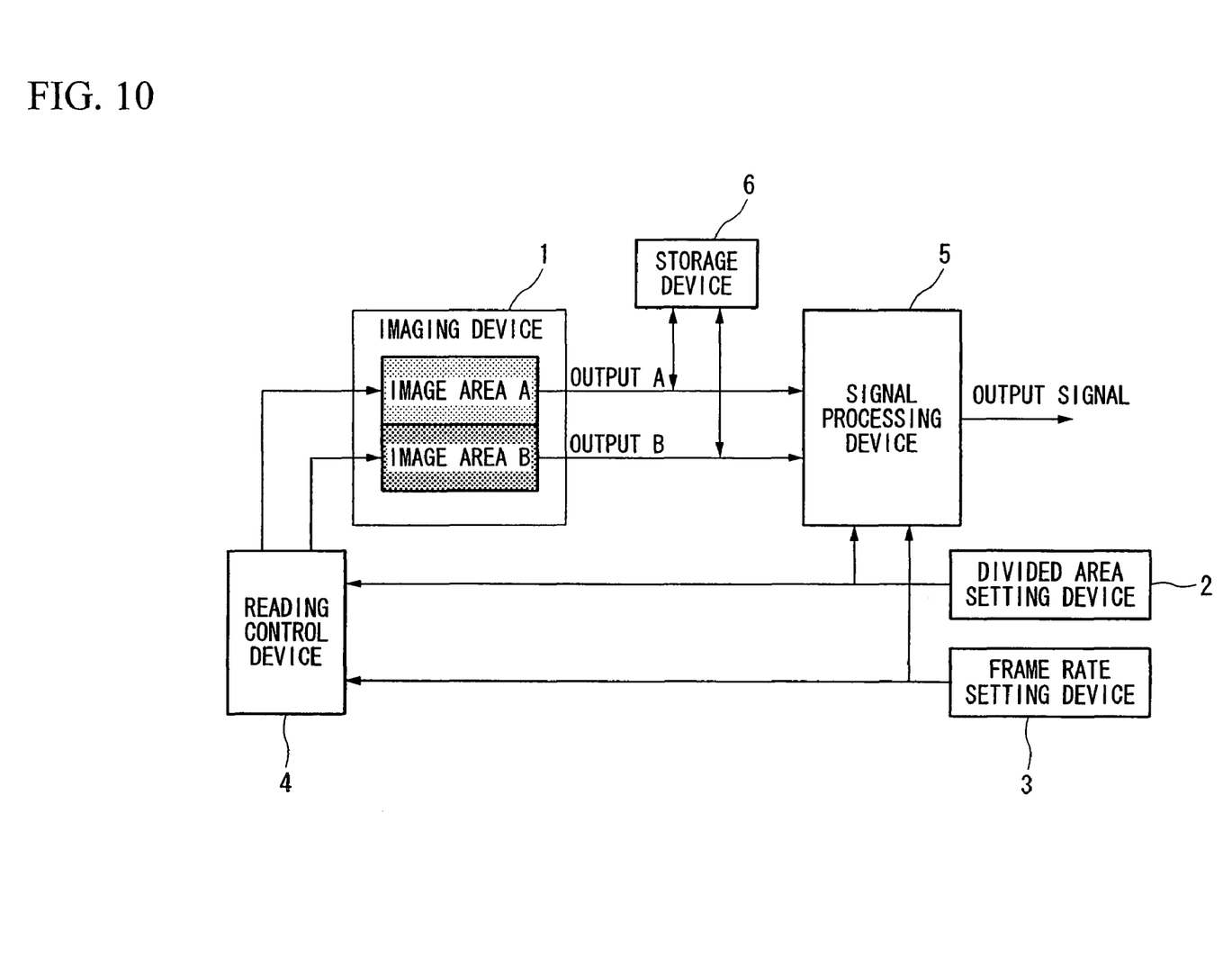
FIG. 10 is a block diagram showing the structure of an imaging apparatus as a variation of the fourth embodiment.

FIG. 10 shows a variation of the present embodiment. In FIG. 6, a storage device 6 has functions of storing each image signal output from the imaging apparatus 1 into an internal storage medium thereof, and reading the image signal from the storage medium so as to output the signal. The storage device 6 may consist of two storage units to which the image signals of the image areas A and B are stored individually.

The signal processing device 5 executes the above-described process so that signals stored and read at different frame rates, which are assigned to respective different image areas, have the same frame rate between the image areas. When the image signals of the image areas A and B can be stored in and read from the storage device 6, as discussed above, the number of stored frames per unit time can be reduced with respect to the image area B having a lower frame rate. Therefore, a limited memory capacity can be effectively used for storing a larger amount of data or performing image data storage for a longer time, in comparison with the conventional apparatus.

In addition, even when the amount of data to be stored per unit time increases due to high-speed photography, the length of time possible for storage is not greatly decreased, thereby allowing comfortable photography. Furthermore, the length of time for storage can be increased, or the image compression rate can be increased for improving the image quality, thereby preferably meeting the user needs.

Figure 11:
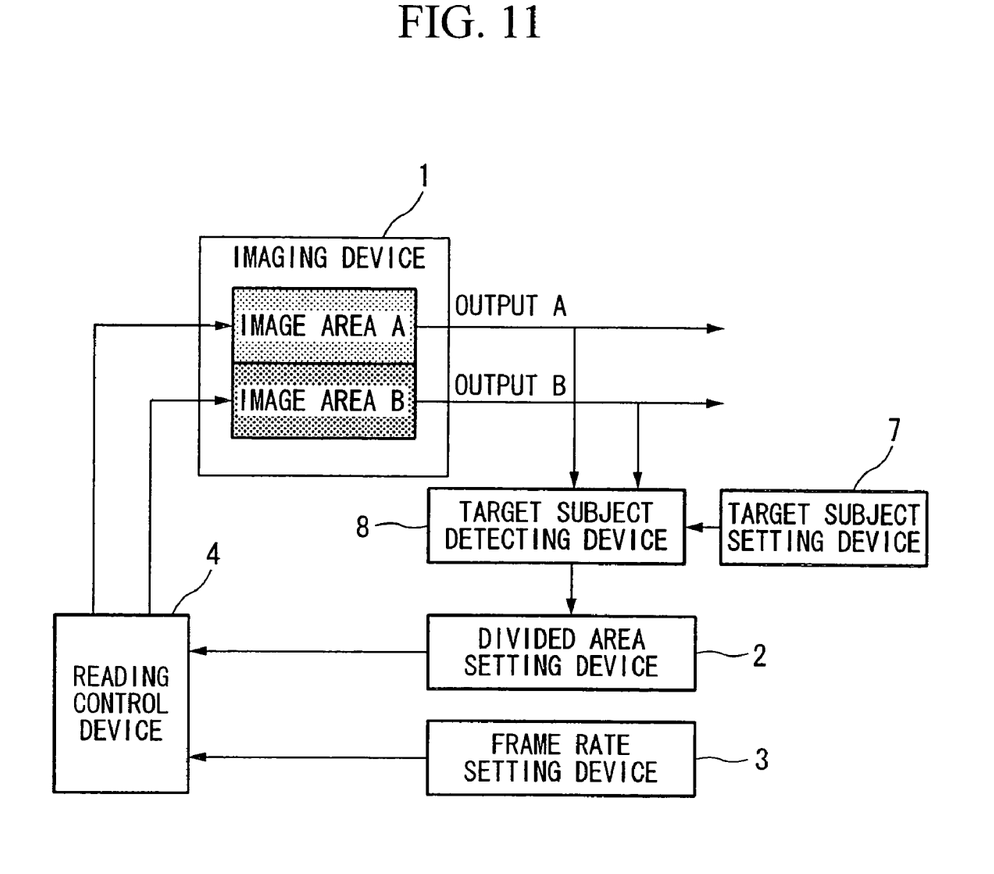
FIG. 11 is a block diagram showing the structure of an imaging apparatus as a fifth embodiment in accordance with the present invention.

Next, a fifth embodiment of the present invention will be explained. FIG. 11 shows the structure of the imaging apparatus in the present embodiment. In addition to the structural elements shown in FIG. 1, a target subject setting device 7 and a target subject detecting device 8 are provided. The target subject setting device 7 sets a target subject in the image captured by the imaging device 1 in accordance with the user's designation. Based on the data of the target subject set by the target subject setting device 7, the target subject detecting device 8 detects the target subject included in the image formed by the signals output from the imaging device 1. The divided area setting device 2 sets image areas in accordance with the position of the target subject detected by the target subject detecting device 8.

The target subject setting device 7 may be a liquid crystal electronic view finder of a touch panel type, which can recognize a contact operation by the user on the screen of the touch panel. The target subject setting device 7 outputs data of an image pattern including the target subject, which is designated on the screen, as position data in the image, to the target subject detecting device 8.

Based on the position data of the target subject, the target subject detecting device 8 recognizes the image of the target subject in time-series frame (video) images sequentially output from the imaging device 1, and follows the image pattern with respect to the recognized image.

Figure 12A:
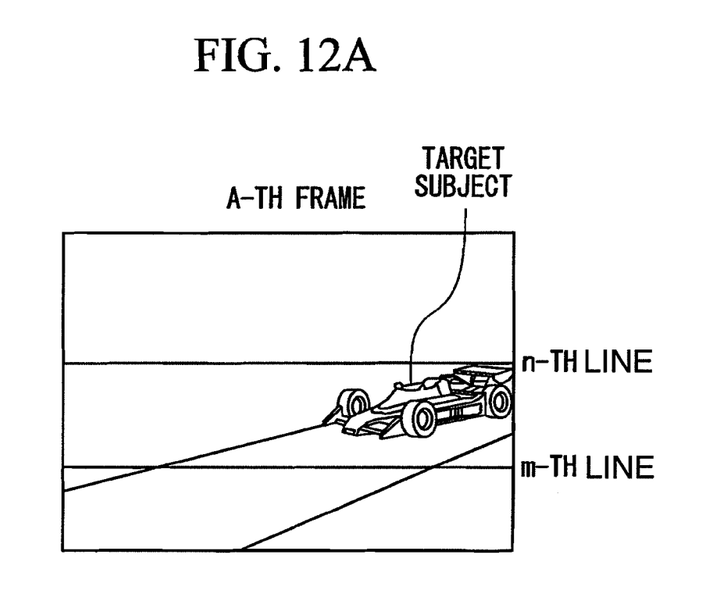
FIGS. 12A and 12B are diagrams used for explaining an image area setting method in the fifth embodiment.

Here, it is assumed that an automobile approaching from a distant place is a target subject (see FIG. 12A). The user touches the screen of the target subject setting device 7 so as to designate an area which includes the target subject. The position data of the designated area is output to the target subject detecting device 8. Based on the area position data, the target subject detecting device 8 recognizes an image pattern corresponding to the above area, based on the image signals of this area. When an area including this image pattern is defined using reading lines with respect to the imaging device 1, in FIG. 12A, the image pattern of the area between the n-th line and the m-th line is recognized as the image pattern used for following the target subject.

The setting of the target subject can be performed by various kinds of methods. For example, when the user designates the positions of the n-th line and the m-th line respectively, the image pattern of the area interposed by these lines may be recognized. In another example, when the user designates a rectangular area on the screen in a manner such that the upper side and the lower side of the relevant rectangle respectively coincide with the n-th line and the m-th line, the image pattern of the area interposed by the upper side and the lower side may be recognized. In addition, the image pattern of a slightly wider area formed by the area designated by the user and also a few outer lines of this designated area may be recognized.

In FIG. 12A, when the target subject exists between the n-th line and the m-th line in the A-th frame, the divided area setting device 2 assigns this area and the remaining area respectively to the image areas A and B. After that, the target subject detecting device 8 follows the image pattern of the area corresponding to the target subject by a known method such as block matching.

When the area which can contain the target subject is defined between the N-th line and the M-th line at the (A+a)th frame (see FIG. 12B), the target subject detecting device 8 assigns this area and the remaining area respectively to the image areas A and B.

Similar to the first embodiment, the area setting can be performed using the pulse signals φVST (i.e., φVSTA and φVSTB in the first embodiment) and φVRST. In addition, the area setting may be performed for each frame, or for every a few frames.

In accordance with the above-described structure and method, the image areas can be changed dynamically; thus, high-speed or slow-speed motion control appropriate for the photographer's intention can be performed flexibly and finely based on the area where the moving subject exists.

Figure 12B:
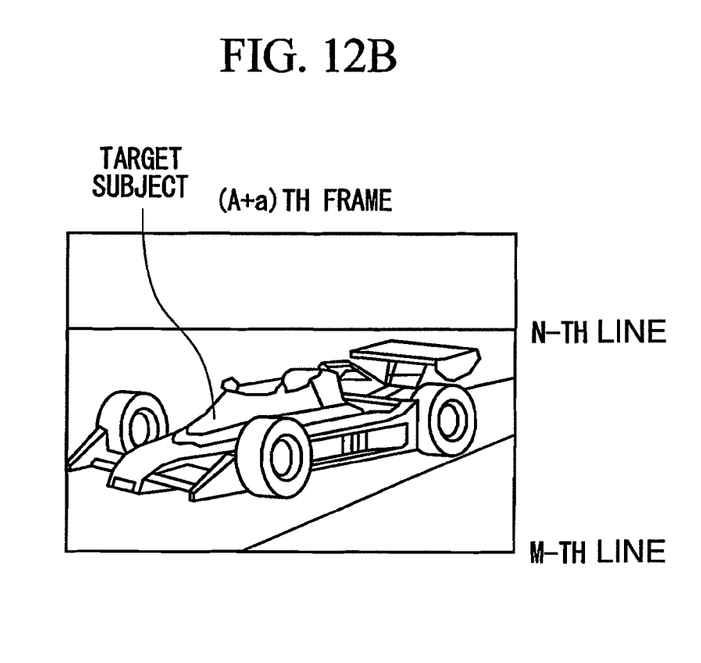

For example, when the size of the target subject gradually increases in the video image as shown in FIGS. 12A and 12B, if the image area designated for the target subject is fixed, the target subject may protrude from the area assigned thereto. In this case, the target subject may exist over image areas having different frame rates, so that reproduced images may include a strange part. However, in the present embodiment, the area assigned to the target subject can be appropriately set in accordance with the movement of the target subject; thus, photography appropriate for the photographer's intention can be performed while still reducing the processing load imposed on the imaging apparatus.

In contrast, when the size of the target subject gradually decreases in the video image, if the image area designated for the target subject is fixed, a non-target area other than the target subject may gradually increase in the area assigned to the target subject. If the non-target area has only a slight variation as the image, the frame rate of this area may be decreased so as to increase the possible storage time and the speed of the processing. Therefore, in such a case, the size of the area assigned for the target subject can be gradually decreased in accordance with the movement of the target subject, thereby further reducing the processing load imposed on the imaging apparatus.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In accordance with the present invention, image signals of different frame rates assigned to different image areas can be obtained; thus, the amount of image data per unit time can be controlled for each image area. Therefore, photography can be performed at a high frame rate without causing problems in the signal processing.

What is claimed is:

1. An imaging apparatus comprising:
   an imaging device for performing photoelectric conversion of light incident on a photodetective area thereof, and reading signals from the photodetective area so as to output the signals as image signals;
   a divided area setting device for dividing the whole photodetective area into a plurality of image areas;
   a frame rate setting device for setting and assigning individual frame rates to the image areas, where the frame rate setting device variably sets the frame rate assigned to each image area during photography;
   a reading control device for individually controlling a timing for reading the signals of all pixels from each image area set on the photodetective area, in accordance with the corresponding frame rate set by the frame rate setting device;
   a target subject setting device for setting a target subject in an image captured by the imaging device; and
   a target subject detecting device for detecting the target subject set by the target subject setting device and a movement of the target subject based on the image signals;
   wherein the divided area setting device sets the image areas in accordance with a position where the target subject detected by the target subject detecting device is present in the image and with the movement of the target subject; and
   the frame rate setting device variably sets the frame rate assigned to each image area in accordance with the movement of the target subject.

2. The imaging apparatus in accordance with claim 1, wherein the frame rate setting device sets each frame rate for each frame.

3. The imaging apparatus in accordance with claim 1, wherein the frame rate setting device sets one of at least two frame rates assigned to the image areas, and then sets another frame rate assigned to another image area in accordance with the frame rate which has been set.

4. The imaging apparatus in accordance with claim 3, wherein said another frame rate is determined by setting a frame rate ratio of said one of at least two frame rates to said another frame rate.

5. The imaging apparatus in accordance with claim 1, wherein the target subject is set as an area which contains an actual target subject.

* * * * *